May 28, 1929.  H. R. HUGHES ET AL  1,715,082
METHOD AND MECHANISM FOR CONTROLLING MOTORS
Filed April 17, 1926  2 Sheets-Sheet 1
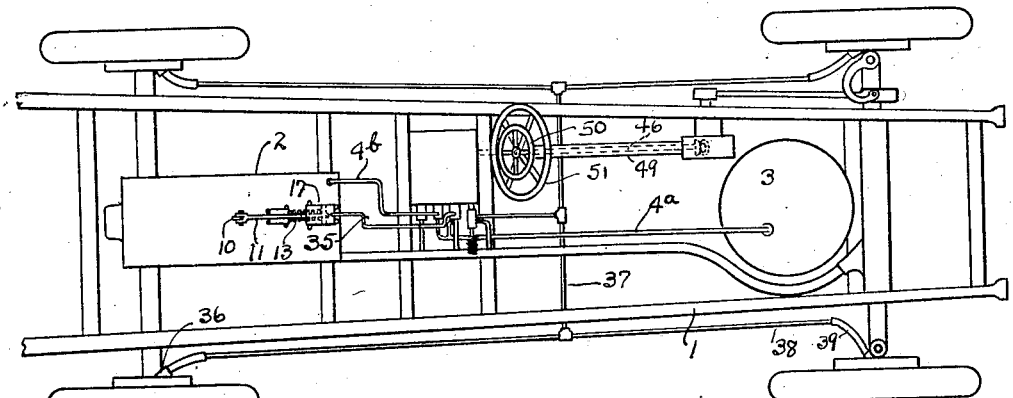
Fig. 1.
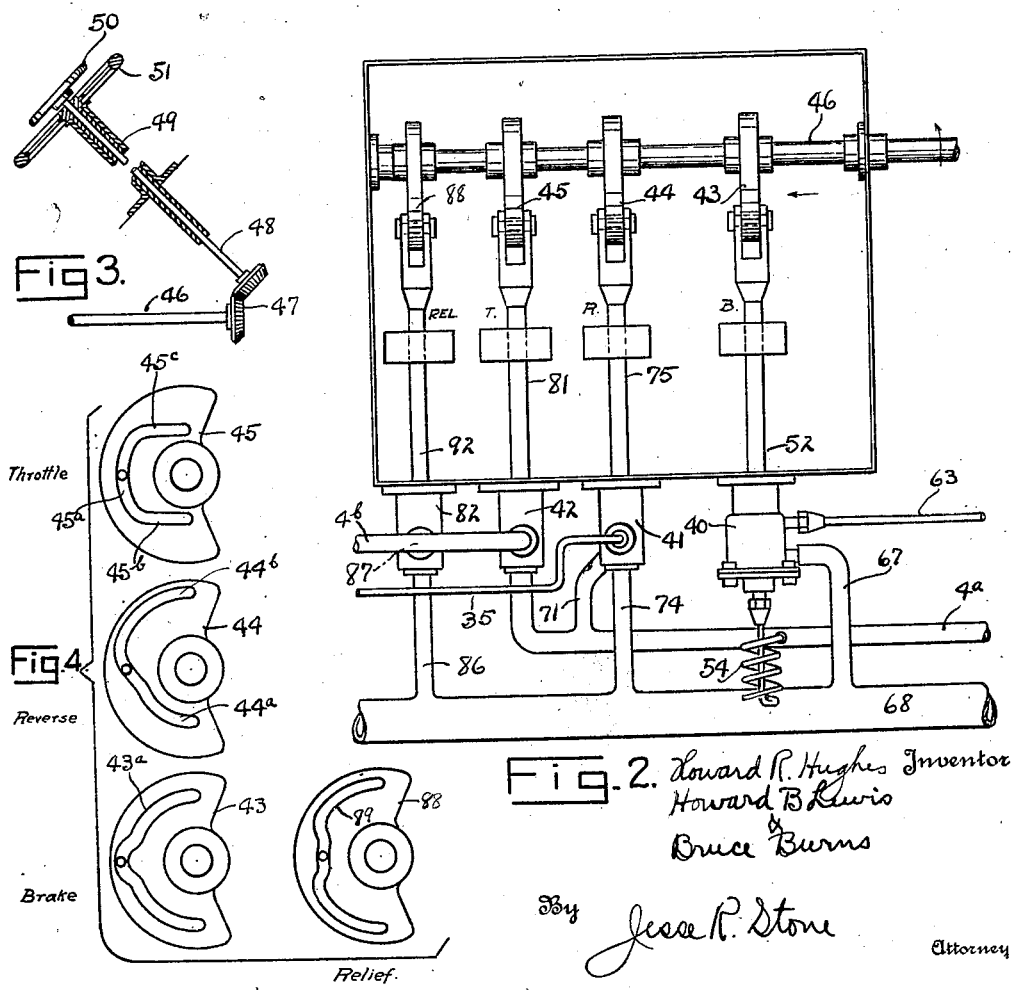
Fig. 3.
Fig. 4.
Throttle
Reverse
Brake
Relief.
Fig. 2.
Howard R. Hughes
Howard B. Lewis
Bruce Burns
Inventors
By Jesse R. Stone
Attorney May 28, 1929.   H. R. HUGHES ET AL   1,715,082

METHOD AND MECHANISM FOR CONTROLLING MOTORS

Filed April 17, 1926   2 Sheets-Sheet 2

Howard R. Hughes
Howard B. Lewis
& Bruce Burns   Inventors

By Jesse R. Stone   Attorney

Patented May 28, 1929.

1,715,082

UNITED STATES PATENT OFFICE.

HOWARD R. HUGHES, HOWARD B. LEWIS, AND BRUCE BURNS, OF HOUSTON, TEXAS.

METHOD AND MECHANISM FOR CONTROLLING MOTORS.

Application filed April 17, 1926. Serial No. 102,647.

The present invention relates to a method of, and apparatus for, controlling a motor. In the operation of a motor that is driven by a fluid or gas under pressure, it is common to provide separate hand-controlled means for accomplishing the forward drive, the reverse drive, and the setting and release of the brakes. The driving of such a motor with skill is only attained by practice, and it also entails annoying manipulation of separate devices.

The general object of this invention is to provide a motor with improved means for controlling it by hand. The motor or engine to which we have applied our invention is admirably adapted for driving an automobile, and one of the objects of the invention is to provide simple controlling means for controlling the brakes as well as the engine.

A further object of the invention is to provide control mechanism for the engine which can be operated by a single hand-operated member which in one position may apply the brakes, and in other position may affect the forward driving of the motor, or in a third position, may drive it in its reverse direction. It is also desired to control the relief valve to correspond with the functioning of the throttle and the brakes.

Further objects of the invention will appear hereinafter.

The invention consists in the method and the mechanism to be described hereinafter, and in those novel features of construction which contribute to produce an efficient control mechanism for a motor or engine.

Figure 5:
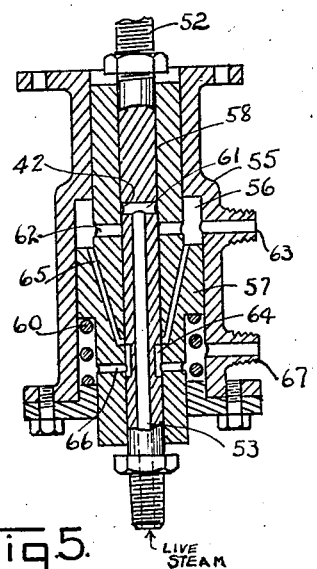
Figure 6:
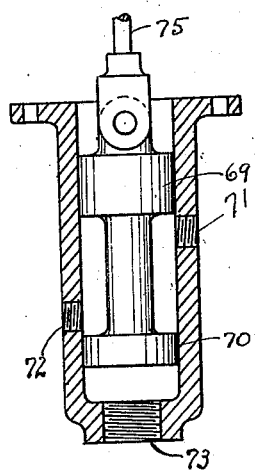
Figure 7:
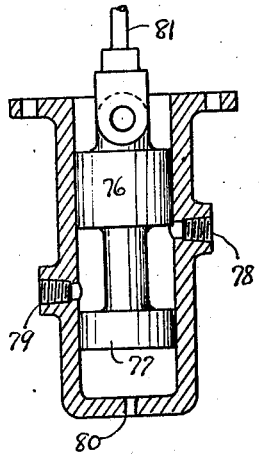
Figure 8:
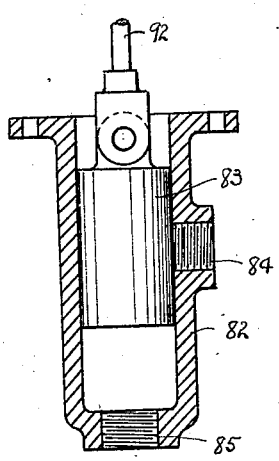
Figure 9:
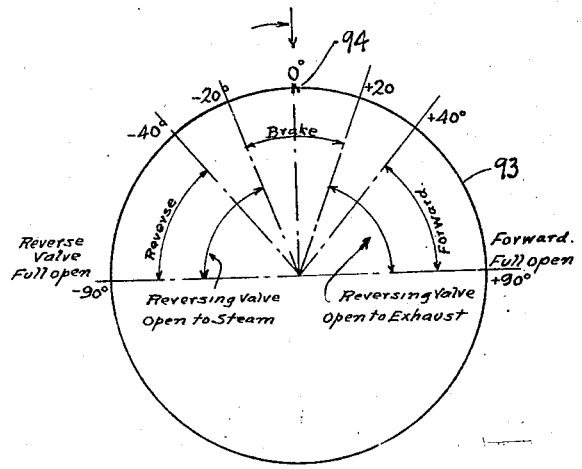

In the drawing, Fig. 1 is a plan of a chassis of an automobile with a portion of the frame broken away. Fig. 2 is a plan of the cam box with the cover removed and showing the valves which are controlled by the cams, certain parts being broken away. Fig. 3 is a section in a vertical plane through the steering column, certain parts being broken away, and illustrating the means for actuating the cam shaft. Fig. 4 is a side elevation showing the four cams which control the relief valve, the brake, the reversing of the engine and the throttle. Fig. 5 is a longitudinal section through the brake valve. Fig. 6 is a longitudinal section through the reversing valve. This view is taken in a vertical plane and looking toward the left as viewed in Fig. 2. Fig. 7 is a longitudinal section through the throttle valve, taken in a vertical plane and looking toward the left as viewed in Fig. 2. Fig. 8 is a longitudinal vertical section through the relief valve and looking toward the right as viewed in Fig. 2. Fig. 9 is a diagram illustrating the mode of operation or control of the motor by the hand-operated member.

In practicing our invention we employ a motor having an automatic valve with valve-mechanism for actuating it; and we provide means for most conveniently regulating the valves controlling the steam supply in forward and reverse operation and in stopping.

The mechanism is constructed in such a way that a single hand-controlled member completely controls the operation of the engine or motor, and in an automobile it may also control the application of the brakes. In operation, we prefer to have the brakes applied when the hand controlled member, which may be a lever or hand wheel, is rotating through an intermediate zone; when said member is moved beyond this zone on one side, the engine will become reversed, and when the member is moved beyond the intermediate zone on the other side, the engine will be driven in a forward direction. While any suitable valve-mechanism may be employed which is capable of being controlled by a single hand-operated means, in the present specification we have described the invention as applied to an automobile engine of common type, employing a Stephenson link for actuating the automatic valve.

Our invention involves a novel method of operation of an engine and consists in applying and releasing the brake through the intermediate zone of movement of the controlling member, driving the motor in a forward direction when the controlling member is on one side of the braking zone, and driving the engine in a reverse direction when the controlling member is on the other side of the braking zone. Our novel method also may include the maintenance of a neutral zone between the braking zone and each of the other zones, within which the throttle will be closed and the brakes released.

In the drawings, 1 represents the chassis of an automobile which is driven by a motor 2 in the form of a steam engine. The engine is supplied with operating fluid or steam from a boiler 3 mounted at a forward point on the chassis. A steam pipe $4^a$, $4^b$ leads the steam to the steam-chest of the engine.

The motor 2 is shown only diagrammatically and may be understood as by any usual type of steam engine having the Stephenson link control. Said link is shifted through a lever 10 connected to a piston rod 11, the piston on which works in a cylinder 17. Said piston is in forward position toward the closed end of the cylinder when the lever 10 and its connecting link are in forward driving position. The piston is held resiliently in that position by the spring 13. The piston may be moved against the action of said spring to throw the lever 10 into reverse position through the admission of steam behind said piston by way of pipe 35, as will be later described.

In order to control the operation of the engine by hand and to control the four-wheel fluid-operated brakes 36 of the automobile, we provide a pipe system 37 which connects with the brakes. The brakes may be of any directly or indirectly fluid-operated type; for example, they may be air brakes, or hydraulic brakes of the lockhead type, or they may be brakes of the commonly called "mechanical type" with the substitution for the usual hand-lever or foot pedal of a fluid-actuated piston or motor, but we prefer to control their application by steam admitted to the pipe system 37. The pipe system includes side pipes 38 which extend forwardly, and the forward ends of these pipes are connected by flexible tubes 39 with the brakes.

The supply of steam to the brakes is controlled by brake valve 40 (see Fig. 2), and the flow of steam to the reversing cylinder 17 is controlled by reversing valve 41. A throttle valve 42 which connects to the pipes 4ª, 4ᵇ controls admission of steam to the steam chest of the engine. These valves may be controlled in any suitable manner but we have shown slot cams 43, 44 and 45 carried on a cam shaft 46 which is rotated at will through a bevel gear connection 47 at the foot of an inner shaft 48 mounted in the steering column 49 and provided with a lever or hand-wheel 50 just above the steering wheel 51 of the automobile. The cams 43, 44 and 45 are illustrated in detail in Fig. 4, and the valves are illustrated in detail in Figs. 5 to 7 inclusive.

The brake valve is actuated by a valve stem 52 and is constructed with a pressure chamber operating in such a way that the pressure in the pressure chamber builds up according to the amount of movement given to the valve stem 52. In the present instance the valve stem 52 is tubular so that it presents a longitudinal bore or passage 53 connected through a flexible connection 54 to the steam pipe 4ª. This brake valve therefore includes a casing 55 with a pressure chamber 56 in which moves a valve member 57 in the form of a piston fitting in the bore of the casing. The valve stem 52 slides freely through a bore 58 in the valve member 57. A coil spring 60 in the outer end of the pressure chamber 56 exerts its force in a direction to move the valve member 57 against the pressure in the chamber 56 and operates to return the valve member 57 to normal. The stem 52 has an annular groove 42 connecting with a cross-port 61 communicating with the tubular passage 53. In Fig. 5 the stem is in normal position with the brakes released. When the stem 52 is moved in an outward direction by its cam, the port 61, which comes in communication with a cross passage 62 in the valve member 57, admits steam to the pressure chamber 56. This develops a pressure in the pressure chamber 56 and compresses the spring 60 and moves the valve member 57 forward in the same direction in which the stem 52 was moved to admit the steam. In other words, the action of the pressure chamber is to effect a movement of the port 62 along with the valve stem in its opening movement until the desired pressure is built up. These features of construction enable this valve to apply the brakes very lightly or with considerable force, depending upon the amount of movement given to the valve stem.

The pressure chamber 56 is provided with an outlet pipe 63 which connects to the pipe system 37 to carry the steam to the brakes. After applying the brakes they may be released by withdrawal of the stem 52 under the action of its cam, that is to say, by moving the stem in a reverse direction; this movement connects up exhaust passages 64 in the side of the stem with inclined exhaust passages 65 in the valve member 57. These ports are normally not in communication. From the exhaust passages 64 the steam passes through cross ports 66 which admit the steam into the interior of the pressure chamber 56 and at its outer end, from which point the steam passes through an exhaust connection 67, to the exhaust pipe 68 of the engine.

The reversing valve is of piston type (see Fig. 6) with two heads 69 and 70. In the position in which the valve is shown in Fig. 6 the valve permits live steam to flow through a pipe connection 71 into the space between the heads and this steam in the open position of the valve passes out through an outlet 72 which connects to the pipe 35 which has already been referred to and which conducts steam to the reversing cylinder 17. When the valve is in its closed position the head 70 will be located in the space between the outlet 72 and the live steam pipe, and this will permit exhaust back through the pipe 35 and through an outlet 73 in the end of the valve which connects to an exhaust branch pipe 74 leading to the exhaust manifold 68. The stem 75 of this valve is operated by a slot in its cam 44.

The throttle valve 42 is also of piston type and has two heads 76 and 77. In the open position of the valve shown in Fig. 7, the steam from the engine flows in through the inlet 78 connected to the pipe 4ᵃ and flows out through an outlet 79 connected to the pipe 4ᵇ. In the closed positoin of the valve the head 77 moves into the space between the inlet 78 and outlet 79 and permits the steam in the pipe 4ᵇ and in the steam chest to flow out through a port 80 in the end of the valve casing.

The valve stem 81 of the throttle valve is operated by its cam like the valve stems 52 and 75.

We provide automatic means for releasing the pressure in the valve chest after the throttle is closed and before the brakes are applied. For this purpose we provide a relief valve 82 (see Figs. 2 and 8). This valve is of piston type and has a single head 83. In the closed position of this valve it covers an inlet 84 from the steam chest of the engine and when in its open position this port is uncovered so as to permit exhaust through an outlet 85 which is connected to the exhaust manifold 68 by a branch exhaust pipe 86.

The inlet 84 to the valve 82 connects by a short vertical branch pipe 87 with the under side of the pipe 4ᵇ (see Fig. 2). This relief valve is operated through its cam 88 slightly in advance of the operation of the brake. As will be noted from Fig. 4, the cam 88 is adapted through the curvature of the cam slot 89, to allow exhaust of pressure from the steam chest, either from the reverse or the forward zone of movement of the control wheel, somewhat before the brakes are applied.

The operation of the cams will be best understood by referring to the diagram Fig. 9. In this diagram the circle 93 represents the hand wheel 50 which can rotate the cam shaft 46 through the bevel gear connection 47; and the pointer 94 on the circle 93 may be considered as a mark on the wheel which indicates the location of a lever which the wheel takes the place of. In other words, when the pointer 94 is at the zero point, as indicated in Fig. 9, the wheel is in its neutral position. When in this position there is a zone of movement of 20° on each side of the zero point through which the pointer 94 can move and during which the movement of the wheel controls the brakes. In the position shown in Fig. 9, the relief valve is open and the brakes are fully applied as indicated by the cam slot 43ᵃ in the cam 43. If the wheel is rotated so that the pointer 94 moves out of this intermediate zone in a right-hand direction, the engine will be driven in a forward direction; that is to say, the branch 45ᵇ of the slot 45ᵃ in the cam 45 will come into operation and will hold the throttle in its open position. At the same time the lower end 44ᵃ of the slot in the reversing cam 44 will come into play and will hold the reversing valve in its closed position. This forward zone is indicated on the diagram by the word "forward" and covers the movement of the pointer from an angle of 40° to the right of the zero point around to 90°.

In a similar manner, if the wheel 50 is rotated toward the left the pointer 94 would move into a reversing zone commencing at 40° and extending to 90° toward the left. In this zone of movement the throttle valve will be held open by the upper branch 45ᶜ of its slot and the reversing valve will be opened by the extension 44ᵇ of the slot of the reversing cam 44. Between the "forward zone" and the "reversing zone" we prefer to allow a small zone of 20° on each side of the braking zone through which the operation of the engine is not affected by the brake or throttle.

What we claim is:

1. In a mechanism for controlling a fluid operated motor having an automatic valve driven from a part of the engine under control of a reversing valve gear, the combination of a throttle valve for governing the supply of operating fluid to the motor, a shaft driven by the motor, a brake on said shaft, a single hand operated member, means actuated by the hand operated member for opening and closing the throttle, means actuated by the hand operated member for applying the brake, and means actuated by the hand operated member for shifting the valve gear to reverse the motor.

2. In a mechanism for controlling a fluid operated motor, the combination of a shaft driven by the motor, a brake on said shaft, a single hand operated member, means controlled by said hand operated member for applying said brake, and means controlled by said hand operated member for reversing the motor.

3. In a mechanism for controlling a fluid operated motor, the combination of a throttle valve for governing the supply of operating fluid to the motor, a shaft driven by said motor, a brake on said shaft, a single hand operated member, means controlled by the said hand operated member for opening and closing said throttle valve, and means controlled by said hand operated member for applying the brake.

4. In a mechanism for controlling a fluid operated motor having an automatic valve driven from a part of the engine under control of a reversing valve gear, the combination of a throttle valve for governing the supply of operating fluid to the motor, a single hand operated member, means actuated by the hand operated member for opening and closing the throttle, and means actuated by the hand operated member for shifting the valve gear to reverse the motor.

5. In a motor controlling mechanism for an operated device the combination of brake-mechanism, a hand-operated member, valve-mechanism for controlling the supply of operating fluid to the engine and for reversing the same, means controlled by the hand-operated member when in a certain position for applying the brakes, means controlled by the hand-operated member in another position for controlling the valve-mechanism to drive the motor in a forward direction, and means controlled by the said hand-operated member when held in another position for controlling the valve-mechanism to drive the motor in a reverse direction.

6. In a motor controlling mechanism for an operated device the combination of brake-mechanism, a hand-operated member, means controlled by the hand-operated member when in mid-position for applying the brakes, valve-mechanism for controlling the supply of operating fluid to the engine and for reversing the same, means for regulating the valve-mechanism to drive the motor in a forward direction or in a reverse direction and controlled by the hand-operated member, said hand-operated member operating when held on one side of said mid-position to drive the engine ahead and on the other side of said mid-position to drive the engine in reverse direction.

7. In a motor controlling mechanism for an operated device, the combination of brake-mechanism, a hand-operated member, means controlled by the hand-operated member when in mid-position for applying the brakes, valve-mechanism for controlling the supply of operating fluid to the engine and for reversing the same, means controlled by the hand-operated member when held on one side of said mid-position for controlling the valve-mechanism to drive the motor in a forward direction, and means controlled by the hand-operated member when held on the other side of said-position for controlling the valve-mechanism to drive the motor in a reverse direction.

8. In a motor controlling mechanism for an operated device the combination of a valve mechanism for controlling the supply of operating fluid to the engine and for reversing the same, a hand-operated member, fluid operated brake mechanism, means controlled by said hand-operated member when in one position to admit operating fluid in said motor to drive the same in a forward direction, and when in a different position to cut off said fluid from the motor, and to operate said brake mechanism.

9. In an engine controlling mechanism for an operated device the combination of a hand-operated member, a throttle valve for controlling the supply of operating fluid, to the steam chest of the engine, fluid actuated brake-mechanism, a brake-valve for controlling the same, a relief-valve for exhausting the operating fluid from the steam chest, means controlled by the hand-operated member for controlling the throttle valve, for controlling the brake-valve to apply the brakes, and for actuating the relief-valve to release the steam from the steam chest.

10. In an engine controlling mechanism for an operated device, the combination of a hand-operated member, a throttle valve for controlling the supply of operating fluid to the steam chest of the engine, fluid actuated brake-mechanism, a brake-valve for controlling the same, a relief-valve for exhausting the operating fluid from the steam chest, means controlled by the hand-operated member for controlling the throttle valve and for controlling the brake-valve to apply the brakes, and also for controlling the relief-valve to actuate the latter and release the steam from the steam chest after the throttle is completely closed.

11. In an engine controlling mechanism for an operated device, the combination of a hand-operated member, a throttle valve for admitting steam to the steam chest of the engine, an automatic valve with valve-mechanism for actuating the same for driving the engine forward and in reverse, a reversing valve, hand-operated means for controlling the throttle and the reversing valve, and means controlled by the reversing valve for shifting the valve-mechanism to reverse the engine.

12. In an engine controlling mechanism for an operated device, the combination of an automatic valve with valve-mechanism for actuating the same by moving part of the engine, a throttle-valve for admitting steam to the steam-chest of the engine, a reversing valve, means actuated thereby for shifting the valve mechanism for reversing the engine, fluid-operated brakes with a brake-valve for admitting fluid thereto, and a hand-operated member for controlling the throttle valve, the reversing valve and the brake-valve.

13. In an engine controlling mechanism for an automobile, or the like, the combination of an automatic valve-mechanism for actuating the same by a moving part of the engine, a throttle-valve for admitting steam to the steam-chest of the engine, a reversing valve, means actuated thereby for shifting the valve-mechanism for reversing the engine, fluid-operated brakes with a brake-valve for admitting the fluid thereto, a relief valve for releasing the steam chest pressure, a hand-operated member for controlling the throttle valve, the reversing valve, the brake-valve, and the relief-valve.

14. In an engine controlling mechanism for an automobile or the like, the combination of a valve for controlling flow of steam to the engine, a fluid actuated brake, a hand-operated member adapted when moved in one direction to admit steam to the engine, a brake-valve actuated by the hand-operated member when moved in the other direction, said brake-valve having a pressure chamber for the operating fluid with means cooperating therewith to build up pressure in the pressure chamber to correspond with the amount of movement of the hand-operated member of the brake-valve, and means connecting the brake-valve with the fluid actuated brake.

15. In an engine controlling mechanism for an automobile or the like, the combination of a valve for controlling flow of steam to the engine, a fluid actuated brake, a hand-operated member operating when moved in one direction to admit steam to the engine, a brake-valve actuated by the hand-operated member when moved in the other direction, said brake-valve having a member moved by the hand-operated member and carrying a port for the operating fluid, said brake-valve having a pressure chamber to receive the operating fluid from said port, and a valve-member mounted in the pressure chamber so as to be moved by the pressure therein in the same direction as the port-carrying member and having a passage therein to cooperate with the said port, the pressure in the pressure chamber tending to maintain the said passage slightly in advance of the port, and means connecting the passage with the fluid actuated brake.

16. In an engine controlling mechanism for an automobile, or the like, having a fluid-actuated brake, the combination of a valve for controlling flow of the operating fluid to the brake, said valve having a hand-operated stem with a port therein and having a pressure chamber to which the fluid is admitted through said port, a valve member in said pressure chamber having a passage to cooperate with the port and operating so as to be moved by the pressure in the pressure chamber in the same direction that the stem moves to admit the fluid to the pressure chamber, and means for connecting the pressure chamber to the brake.

17. In an engine controlling mechanism for an automobile or the like, having a fluid-actuated brake, the combination of a valve for controlling flow of the operating fluid to the brake, said valve having a hand-operated stem with a port therein and having a pressure chamber to which the fluid is admitted through said port, a valve member in said pressure chamber having a passage to cooperate with the port and operating so as to be moved by the pressure in the pressure chamber in the same direction that the stem moves to admit the fluid to the pressure chamber, a spring resisting the movement of the valve-member under the action of the pressure in the pressure chamber, and means for connecting the pressure chamber to the brake.

18. In an engine controlling mechanism for an automobile, or the like, having a fluid-actuated brake, the combination of a brake-valve with a hand-operated valve-member carrying a port, said valve having a pressure chamber to which the fluid is admitted through said port, a fluid-actuated valve-member in said pressure chamber having a passage to cooperate with the port and operating so as to be moved by the pressure in the pressure chamber in the same direction as the hand-operated valve-member when the latter is moved to admit fluid to the pressure chamber, means for connecting the pressure chamber to the brake, said hand-operated valve member and said pressure operated valve member having exhaust ports to cooperate when the hand-operated valve member is moved in reverse direction to release the fluid pressure on the brake.

19. In an engine controlling mechanism for an automobile, or the like, having a fluid-actuated brake, the combination of a valve casing having a pressure chamber therein and a fluid-operated valve member moving in said pressure chamber, a spring for resisting the movement of the valve-member under the action of the pressure, said valve member having an inlet passage for the operating fluid, a hand-operated valve-member having a port to communicate with the inlet passage by a movement of the hand-operated valve-member in the said direction as the fluid-operated valve-member moves under the action of the pressure, means connecting the pressure chamber to the brake for applying the same, said pressure operated valve-member and said hand-operated valve member having exhaust ports to cooperate by movement of the hand-operated valve member in a reverse direction to exhaust the fluid pressure from the brake.

20. In an engine controlling mechanism for an automobile, or the like, the combination of an automatic valve with valve-mechanism for actuating the same, a hand-operated member, a cam-shaft actuated thereby, a throttle valve for admitting steam to the steam-chest of the engine, a brake-valve for admitting steam to the brakes of the automobile, a reversing cylinder with means connecting the same with the valve-mechanism to reverse the engine, a reversing valve for admitting steam to the reversing cylinder, said cam-shaft having a cam for actuating the throttle valve, a cam for actuating the brake-valve, and a cam for actuating the reversing valve, whereby all of said valves are controlled by the same hand-operated member.

21. In an engine controlling mechanism for an automobile, or the like, the combination of an automatic valve with valve-mechanism for actuating the same, a hand-operated member, a cam-shaft actuated thereby, a throttle valve for admitting steam to the steam-chest of the engine, a brake-valve for admitting steam to the brake of the automobile, a reversing cylinder with means connecting the same with the valve-mechanism to reverse the engine, a reversing valve for admitting steam to the reversing cylinder, said cam-shaft having a cam for actuating the throttle valve, a cam for actuating the brake-valve, and a cam for actuating the reversing valve, whereby all of said valves are controlled by the same hand-operated member, and a relief-valve for releasing the steam pressure in the steam-chest.

22. In a motor controlling mechanism for an automobile, or the like, the combination of a hand-operated member mounted to rotate, brake-mechanism, means actuated by the hand-operated member through an intermediate zone for releasing the steam pressure in the steam chest and then applying the brake, means actuated by the hand-operated member when moved through a zone for driving the motor in a forward direction, and means actuated by the hand-operated member when moving through a zone on the other side of the intermediate zone for driving the motor in a reverse direction.

23. In a motor controlling mechanism for an automobile, or the like, the combination of a hand-operated member mounted to rotate, a cam-shaft, brake mechanism, a cam on the cam-shaft for controlling the brake-mechanism, a reversing cam on the cam-shaft, means actuated thereby for reversing the motor, a brake cam on the cam shaft, means actuated thereby for controlling the brakes of the automobile, said cams constructed and operating so that when the rotatable hand-operated member is moving through an intermediate zone, the brakes will be applied and when the same is moving through a zone at one side of the intermediate zone, the motor will be driven in a reverse direction, and when rotated through a zone on the other side of the intermediate zone the motor will be driven in a forward direction.

24. In an engine controlling mechanism for an automobile, or the like, the combination of an automatic valve with valve-mechanism for actuating the same, a hand-operated member, a throttle valve for admitting steam to the steam-chest of the engine, a fluid operated brake mechanism, a brake-valve for admitting steam to the brake mechanism, a reversing cylinder with means connecting the same with the valve-mechanism to reverse the engine, a reversing valve for admitting steam to the reversing cylinder, and connections between said hand-operated member and said valves whereby said valves may be selectively controlled.

25. In an engine controlling mechanism for an automobile, or the like, the combination of an automatic valve with valve mechanism for actuating the same, a hand-operated member, a throttle valve for admitting steam to the steam-chest of the engine, a fluid-operated brake mechanism, a brake valve for admitting steam to the said brake mechanism, and connections between said hand-operated member and said throttle valve and brake valve, whereby said valves may be operated.

26. In a motor controlling mechanism for an automobile, or the like, the combination of an automatic valve for the motor with valve mechanism for actuating the same, a fluid pressure device, a valve for the fluid pressure device, brake mechanism, a hand-operated member with means actuated thereby for applying the brakes when the same is moved in one direction, and means actuated by the hand-operated member when moved in the opposite direction to open the valve and admit fluid to the fluid pressure device, and means connecting the fluid pressure device with the said valve-mechanism to reverse the same.

27. In a motor controlling mechanism for an automobile, or the like, the combination of an automatic valve for the motor with valve mechanism for actuating the same, a fluid pressure device, a valve for the fluid pressure device, brake-mechanism, a hand-operated member with means actuated thereby for applying the brakes when the same is moved in one direction, and means actuated by the hand-operated member when moved in the opposite direction to open the valve and admit fluid to the fluid pressure device, a lever connected with the said valve-mechanism to regulate the same, and means connecting the fluid pressure device with the lever to reverse the valve-mechanism.

28. In a controlling mechanism for an automobile engine having a Stephenson reversing link, the combination of brake-mechanism, a hand-operated member, an automatic valve for the engine actuated by the Stephenson link, a fluid pressure device, means controlled by the hand-operated member when moved in one direction to apply the brakes, a valve for the fluid pressure device controlled by the hand-operated member so as to open when the hand-operated member is moved in the opposite direction, and means connecting the fluid pressure device with the Stephenson link to shift the same into reverse position.

29. The method of controlling a variable speed motor and the brake-mechanism of an automobile having a single rotatable hand-operated member for controlling the same, which consists in applying and releasing the brake through an intermediate zone of movement of the member, driving the motor in a forward direction and at continually increasing speed through a zone of movement for the controlling member on one side of the braking zone and driving the motor in a reverse direction and at continually increasing speed through a zone of movement for the controlling member on the other side of the braking zone.

30. The method of controlling a variable speed motor and the brake-mechanism of an automobile having a single member for controlling the same, which consists in applying and releasing the brake through an intermediate zone of movement of the member, driving the motor in a forward direction and at continually increasing speed through a zone of movement for the controlling member on one side of the braking zone, and driving the motor in a reverse direction and at continually increasing speed through a zone of movement for the controlling member on the other side of the braking zone.

In testimony whereof, we hereunto affix our signatures this the 10th day of April, A. D. 1926.

HOWARD R. HUGHES.
HOWARD B. LEWIS.
BRUCE BURNS.